US006920246B2

(12) United States Patent
Kim et al.

(10) Patent No.: US 6,920,246 B2
(45) Date of Patent: Jul. 19, 2005

(54) METHOD FOR SEGMENTATION-BASED RECOGNIZING HANDWRITTEN TOUCHING NUMERAL STRINGS

(75) Inventors: Kye Kyung Kim, Daegu (KR); Yun Koo Chung, Taejon (KR); Su Young Chi, Taejon (KR); Young Sup Hwang, Taejon (KR); Won Pil Yu, Ulsan (KR); Soo Hyun Cho, Taejon (KR); Hyoung Gu Lee, Seoul (KR)

(73) Assignee: Electronics and Telecommunication Research Institute, Taejon (KR)

( * ) Notice: Subject to any disclaimer, the term of this patent is extended or adjusted under 35 U.S.C. 154(b) by 627 days.

(21) Appl. No.: 10/098,457

(22) Filed: Mar. 18, 2002

(65) Prior Publication Data

US 2003/0118235 A1 Jun. 26, 2003

(30) Foreign Application Priority Data

Dec. 26, 2001 (KR) ........................................ 2001-84869

(51) Int. Cl.[7] ............................. G06K 9/34; G06K 9/46
(52) U.S. Cl. ....................................... 382/178; 382/190
(58) Field of Search ................................. 382/171, 173, 382/177–179, 185, 187, 190, 195, 198, 199, 224, 266, 272

(56) References Cited

U.S. PATENT DOCUMENTS

| | | | | |
|---|---|---|---|---|
| 4,672,677 A | * | 6/1987 | Yamakawa | 382/185 |
| 4,727,588 A | * | 2/1988 | Fox et al. | 382/189 |
| 5,245,672 A | * | 9/1993 | Wilson et al. | 382/179 |
| 5,633,954 A | * | 5/1997 | Gupta et al. | 382/187 |
| 5,692,069 A | * | 11/1997 | Hanson | 382/171 |
| 5,787,196 A | * | 7/1998 | Yair et al. | 382/178 |
| 5,943,440 A | * | 8/1999 | Yamada | 382/178 |
| 6,226,403 B1 | * | 5/2001 | Parthasarathy | 382/187 |
| 6,754,385 B2 | * | 6/2004 | Katsuyama | 382/171 |

FOREIGN PATENT DOCUMENTS

JP 2000-40122 2/2000 ............ G06K/9/34

OTHER PUBLICATIONS

Kye Kyung Kim, et al.; Recognition of Unconstrained Handwritten Numeral Strings Using Decision Value Generator; 2001 IEEE; P. 14–17.
Xian Wang, et al.; Holistic recognition of handwritten character pairs; 2000 Pattern Recognition 33; p. 1967–1973.
Thien M. Ha, et al.; Off–Line Handwritten Numeral String Recognition by Combining Segmentation–Based and Segmentation–Free Methods; 1997 Pattern Recognition; vol. 31, No. 3; P. 257–272.

* cited by examiner

*Primary Examiner*—Andrew W. Johns
*Assistant Examiner*—Amir Alavi
(74) *Attorney, Agent, or Firm*—Mayer, Brown, Rowe & Maw LLP

(57) ABSTRACT

Disclosed is a method of segmenting touching numeral strings contained in handwritten touching numeral strings, and recognizing the numeral strings by use of feature information and recognized results provided by inherent structure of digits. The method comprises the steps of: receiving a handwritten numeral string extracted from a pattern document; smoothing a curved numeral image of the handwritten numeral string, and searching connecting components in the numeral image; determining whether or not the numeral string is a touching numeral string; if it is determined that the numeral string is the touching numeral string, searching a contour of the touching numeral string image; searching candidate segmentation points in the contour, and segmenting sub-images; computing a segmentation confidence value on each segmented sub-image by use of a segmentation error function to select the sub-image with the highest segmentation confidence value as a segmented numeral image in the touching numeral string image; if it is determined in the step c that the numeral string is not the touching numeral string, extracting a feature to recognize the segmented numeral image; segmenting the numeral image selected from the touching numeral string in the highest segmenting confidence value; and obtaining remaining numeral string image.

19 Claims, 12 Drawing Sheets

METHOD FOR SEGMENTATION-BASED RECOGNIZING HANDWRITTEN TOUCHING NUMERAL STRINGS

BACKGROUND OF THE INVENTION

1. Field of the Invention

The present invention relates to a method for segmentation-based recognizing handwritten touching numeral strings, and more particularly, to a method of segmenting touching numeral strings contained in handwritten touching numeral strings, and recognizing the numeral strings by use of feature information and recognized results provided by inherent structure of digits.

2. Background of the Related Art

Recognition of handwritten numeral strings is one of pattern recognizing fields which have been most actively researched, because of having various application field such as zip codes recognition, check recognition, format document recognition or the like. A typical method of recognizing handwritten touching numeral strings is executed by a following process. Firstly, after the handwritten numerals are scanned, candidate segmentation points are determined. Strokes are obtained from the candidate segmentation points. After the obtained stroke are aggregated and recognized, the aggregation of the strokes with the highest recognition result value is set as the results of recognizing numeral string. It is difficult to segment the handwritten numeral strings by use of a character width used in the typical print character segmenting method, because of having the variety of writing forms and writing paraphernalia contrary to the print character. In addition, the segmented separate numerals in the touching numeral strings may exhibit a structural feature having a different stroke width due to the segmentation of the overlapped numeral string, contrary to the independent separate numerals contained in the numeral strings, so that it is difficult to normally segment the touching numeral strings based on the only recognized results. However, the touching numeral string contained in the handwritten numeral strings is a major factor of the error recognition in the recognition of the handwritten numeral string. Furthermore, in case of no having preliminary knowledge on the length of the touching numeral string, it is more difficult to recognize the touching numeral string. Accordingly, it is very difficult to segment and recognize the touching numeral string from the handwritten numeral strings. In addition, it is appeared that the recognized results are low relative to the recognized results of numeral strings consisting of only independent separate numerals.

In order to overcome the above drawbacks, several methods have been proposed. According to one method, candidate segmentation points are obtained from the touching numeral string, and the strokes extracted from the segmentation points are aggregated, thereby regarding the strokes with the excellent recognized results. Meanwhile, according to another method, the touching numeral strings are not segmented, but global numeral strings are recognized. The former prior art proposes an off-line recognition system for recognizing the handwritten numeral strings contained in the touching numerals and separate numerals. The system is consisting of four major modules of pre-segmentation, digit detection, segmentation-free, and global decision. The pre-segmentation module divides the input numeral strings into independent groups of numerals. The digit detection module recognizes the numeral groups containing separate numerals. The segmentation-free module segments and recognizes the touching numeral groups containing arbitrary numerals. The global decision module integrates the results of all modules, and determines the acceptance or rejection of the results. The touching numeral strings are recognized through a next step. Potential splitting points are obtained to segment the touching numeral strings. The segmentation point is obtained from the session image, and the potential splitting points comprise a singular point, an end point, a T-joint, and a crossing point. Firstly, the singular point is searched in the session image of the touching numeral strings, and then is eliminated. Very small connecting components which are resulted from after eliminating the singular point are eliminated. After labeling the remaining connecting components, the session image is extended by a stroke width of the original touching numeral string image. The strokes obtained by the above method are aggregated, and the aggregated strokes are recognized. The aggregations of the strokes with the largest width are accepted as the recognized results. The method extracts the strokes from the touching numeral strings by use of feature segmentation points to recognize the touching numeral strings, and aggregates the strokes depending upon the recognized results. The more a length of the numeral strings is long, the more the number of the strings to be aggregated is increased. Therefore, in order to obtain the final recognized results, the more calculating amount is required. Error recognition may be happened in the aggregation of the strings depending upon the highest recognition result value among the recognized results of the aggregated strings. The above method has a drawback in that the more a length of the numeral strings is long, the more the error recognizing rate is increased.

According to another prior art, a method for segmenting one character in print character strings is proposed. The method for segmenting the character by use of a character width in the print character strings is unsuitable for the handwritten forms provided by various writing paraphernalia.

SUMMARY OF THE INVENTION

Accordingly, the present invention is directed to a method for segmentation-based recognizing handwritten touching numeral strings that substantially obviates one or more problems due to limitations and disadvantages of the related art.

An object of the present invention is to reduce an error recognizing rate due to error segmentation in case of segmenting the numerals based on only recognized results of the prior segmentation-based recognition method.

Another object of the present invention is to obtain stable recognized results regardless of a length of the numeral strings.

To achieve the object and other advantages, according to one aspect of the present invention, there is provided a method for segmentation-based recognizing handwritten touching numeral strings, the method comprising the steps of: a) receiving a handwritten numeral string extracted from a pattern document; b) smoothing a curved numeral image of the handwritten numeral string, and searching connecting components in the numeral image; c) determining whether or not the numeral string is a touching numeral string; d) if it is determined that the numeral string is the touching numeral string, searching a contour of the touching numeral string image; e) searching candidate segmentation points in the contour, and segmenting sub-images; f) computing a segmentation confidence value on each segmented sub-image by use of a segmentation error function to select the sub-image with the highest segmentation confidence value as a segmented numeral image in the touching numeral string image; g) if it is determined in the step c that the numeral string is not the touching numeral string, extracting a feature to recognize the segmented numeral image; h) segmenting the numeral image selected from the touching numeral string in the highest segmenting confidence value; and i) obtaining remaining numeral string image.

In the step a, samples of handwritten numeral strings extracted from a NIST SD19 database are used to obtain samples of numeral strings handwritten in various forms.

In the step e, the candidate segmentation points comprise local minimum and maximum points, and Large-to-Small or Small-to-Large transition points. The the step e comprises the steps of: e-1) if a distance difference between contours of neighboring pixels is more than a critical value, selecting the pixel as the candidate segmentation point; e-2) obtaining a region in which the candidate segmentation points are existed, and selecting the local minimum and maximum points as the candidate segmentation point existed in the region; e-3) analyzing the candidate segmentation points, and removing all of candidate segmentation points damaging a portion of a stroke, among the analyzed candidate segmentation points; and e-4) segmenting the image from a left of a minimum boundary rectangle to the candidate segmentation point in the numeral string image to create sub-images.

The step f comprises the steps of: f-1) defining a segmentation error function by use of structural feature information and recognized results of the digit; f-2) computing a critical value of the structural features and a rejection value on the recognized result by use of numeral image samples used in the study; f-3) computing each constructional component value of the error function on each sub-image; f-4) computing a segmentation confidence value by use of the pre-calculated critical value and recognition rejection value; f-5) computing a recognition probability value $r_j$ of a sub-image $l^{th}$-segmented by the candidate segmentation point, a horizontal transition value $t_l$ of a pixel on a partial region, and an aspect ratio $a_l$ of the numeral image; f-6) computing three component values of the $l^{th}$-segmented sub-image on each component of segmentation error function; f-7) computing a segmentation error value of the $l^{th}$-segmented sub-image by use of the error values; and f-8) computing a segmentation confidence value of the $l^{th}$-segmented sub-image.

In the step f-2, an average value of the aspect ratio of the \numeral image every numeral classes 0 to 9, an average horizontal pixel transition value, and an average recognition probability value are computed to be used as an critical value, thereby computing the segmentation confidence value of the segmented sub-image.

The step f-2 comprises the steps of: f-2-1) computing a minimum boundary rectangle on the numeral image; f-2-2) computing an average value of the aspect ratio of the digit; f-2-3) computing a horizontal transition average value of the pixel; and f-2-4) computing an average recognition probability value.

The the step f-2-2 comprises the steps of: f-2-2-1) computing the aspect ratio of the digits corresponding to digit classes 0 to 9 used in the study; f-2-2-2) accumulating the aspect ratio computed in the step f-2-2-1; and f-2-2-3) computing the average value of the aspect ratio on each of digit classes 0 to 9. In the step f-2-2, the average value of the aspect ratio of the digit is computed in accordance with:

$$T_a(i) = \frac{1}{N_i} \sum_{j=0}^{N_i} a_{ij} \quad i = 0, 1, 2, \ldots, 9$$

wherein, $T_a(i)$ is an average value of an aspect ratio of a numeral image computed on a digit class i, $a_{ij}$ is the aspect ratio of the image of the $j^{th}$ sample contained in the digit class i, and $N_i$ is the number of samples contained in each class.

The step f-2-3 comprises the steps of: f-2-3-1) normalizing the numeral image in a 50×50 size; f-2-3-2) accumulating the horizontal transition value which is transited from the background pixel to a digit region pixel at 5 pixel intervals, i.e., 5, 10, 15, . . . , $50^{th}$ row; and f-2-3-3) computing the horizontal pixel transition average value on each digit class. In the step f-2-3, horizontal transition average value of the pixel is computed in accordance with:

$$T_t(i) = \frac{1}{N_i} \sum_{j=0}^{N_i} t_{ij} \quad i = 0, 1, 2, \ldots, 9$$

wherein, $T_t(i)$ is a horizontal transition average value of a pixel on a partial region computed on a digit class i, $t_{ij}$ is the horizontal transition average value of the $j^{th}$ sample contained in the digit class i, and $N_t$ is the number of samples contained in each class.

The step f-2-4 comprises the steps of: f-2-4-1) accumulating the recognized results every digit class relative to the independent separate numerals used in the study; and f-2-4-2) dividing the accumulated recognition result value with the number of digit classes to compute an average value. In the step f-2-4, the average recognition probability value is computed in accordance with:

$$T_r(i) = \frac{1}{N_i} \sum_{j=0}^{N_i} t_{ij} \quad i = 0, 1, 2, \ldots, 9$$

wherein, $T_r(i)$ is a horizontal transition average value of a pixel on a partial region computed on a digit class i, $t_{ij}$ is the horizontal transition average value of the $j^{th}$ sample contained in the digit class i, and $N_i$ is the number of samples contained in each class.

In the step f-6, the segmentation error value is calculated in accordance with:

$$err_a(l) = \frac{a_l - T_a(i)}{\max} a_l$$

$$err_t(l) = \frac{t_l - T_t(i)}{\max} t_l$$

$$err_r(l) = r_l - T_r(i)$$

wherein, i is a recognized digit class, S is the number of segmented sub-images, l is a sub-image $l^{th}$-segmented from 1 to S, $a_l$ is an aspect ratio of the numeral image, $t_l$ is a horizontal transition value of the pixel relative to the partial region, $r_l$ is a recognition probability value of the sub-image $l^{th}$-segmented by the candidate segmentation point, $T_a(i)$ is an average value of an aspect ratio of a numeral image computed on a digit class i, $T_t(i)$ is a horizontal transition average value of a pixel relative to a partial region computed on a digit class i, and $T_r(i)$ is an average recognition probability value each computed on a digit class i.

In the step f-7, the segmented error value of the $l^{th}$-segmented sub-image is calculated in accordance with:

$$E(l)=\Gamma(\text{err}_a(l),\ \text{err}_t(l),\ \text{err}_r(l)),\ \text{wherein}\ \Gamma(a,b,c)=(a^2+b^2+c^2)$$

In the step f-8, the segmentation confidence value of the $l^{th}$-segmented sub-image is calculated in accordance with:

$$R(l)=1-E(l)\ l=1,\ 2,\ 3,\ \ldots,\ S$$

In the step h, a leftmost digit of touching digits is selected as the sub-image with the highest confidence value among the computed segmented confidence value on each sub-image.

The method further comprises a step j) of segmenting the numeral image in the touching image, and if a next numeral string image is existed, proceeding to the step c.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIGS. 2A to 2E show samples of handwritten numeral strings contained in touching numeral strings;

DETAILED DESCRIPTION OF THE PREFERRED EMBODIMENTS

A method for segmentation-based recognizing handwritten touching numeral strings according to one preferred embodiment of the present invention will now be explained with reference to the accompanying drawings.

Figure 1:
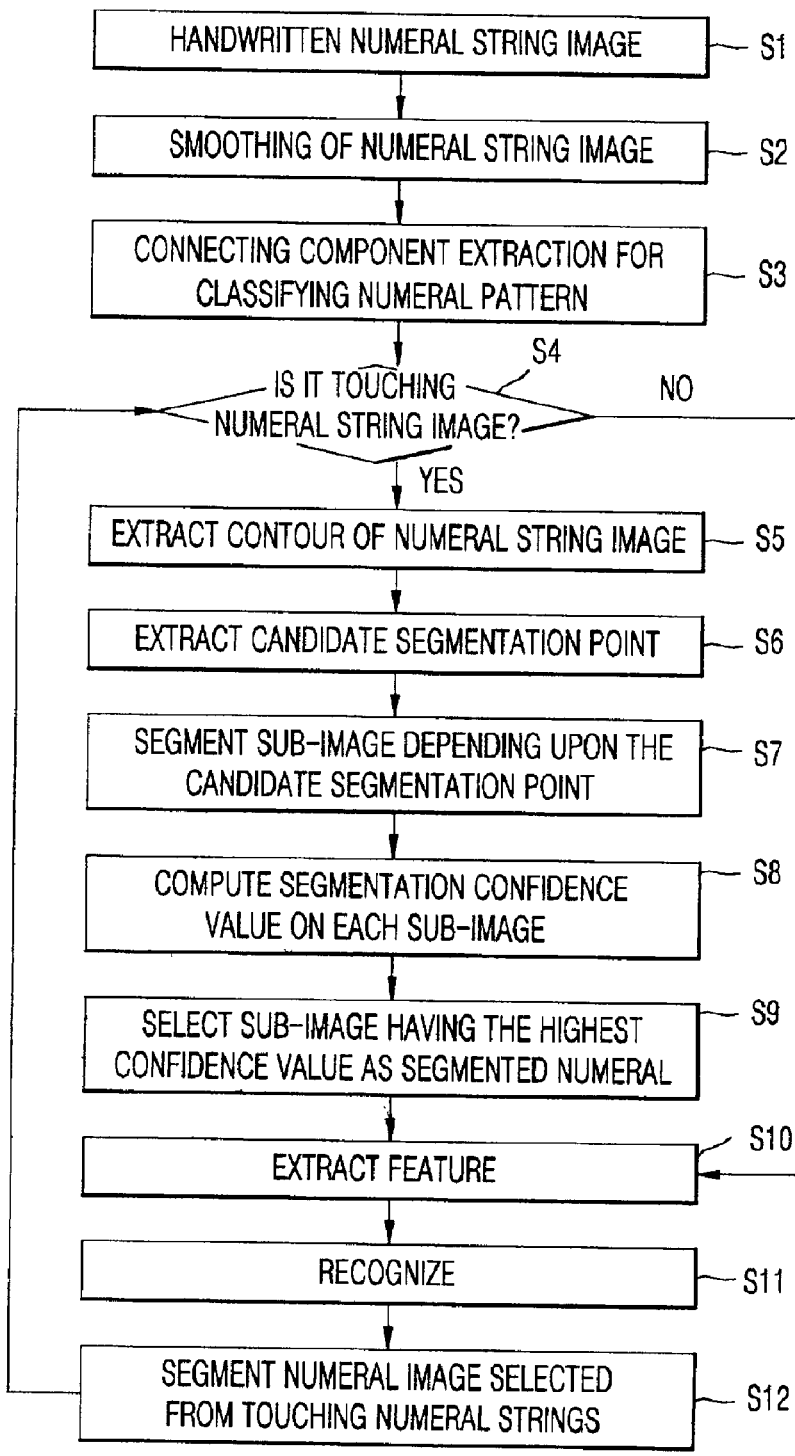
FIG. 1 is a flow chart of a method for segmentation-based recognizing handwritten touching numeral strings according to one preferred embodiment of the present invention.

An embodiment of recognizing numeral strings will be explained according to the method of recognizing handwritten numeral strings shown in FIG. 1.

In steps S1 and S2, handwritten numeral strings extracted from a pattern document prepared in various handwritten forms. Specifically, samples of handwritten numeral strings extracted from a NIST SD19 database are used to obtain samples of numeral strings handwritten in various forms.

FIGS. 2A to 2E show the samples of handwritten numeral strings contained in touching numeral strings. In order to recognize the numeral strings handwritten in various forms, it uses a numeral string database obtained from the environment in which writing paraphernalia and written region are not restricted. The samples of numeral strings handwritten in various forms may be extracted from the handwritten forms of NIST SD19, and separate numerals and touching numeral string are contained in the numeral strings, respectively.

In step S2, a smoothing process of image of curved digit is implemented, and connecting components are found. Specifically, a smoothing algorism is employed to the input image of numeral strings, to extract the connecting components. The extraction of the connecting components is to classify a pattern of the digits in the handwriting numeric strings.

FIG. 2A shows that a numeral string has 7 connecting components, a length of the numeral string being ten. The length of the numeral string indicates the number of digits contained in the numeral string. FIGS. 2B and 2C show a sample of touching numeral string having three touching digits and two touching digits in the numeral string, the length of the numeral string being four. FIGS. 2D and 2E show the numeral string having five digits. FIGS. 2A to 2E show various images of numeral strings, wherein the forms of touching digit are various. In order to smooth the curved image happened at an inputting process by using of unrestricted writing paraphernalia and the image obtaining process, the smoothing algorism is employed. The smoothing-processed image of numeral strings prevents the selection of multiple candidate segmentation points at the process of searching the candidate segmentation point of touching numeral string. In addition, the smoothing-processed image is a factor effecting on the recognizing result of segment digit.

In steps S4 and S5, it determines whether the input numeral string is a touching numeral string. If it is the touching numeral string, it searches a contour of the touching numeral string image. In other words, the candidate segmentation points for segmenting the touching numeral string are obtained on the contour of the numeral string image. The candidate segment point may be obtained from structural feature information shown in the touching numeral region on the contour of the touching numeral string.

In step S6, it searches four kinds of candidate segmentation points. In other words, the candidate segmentation points for segmenting the touching numeral strings are searched.

Figure 3A:
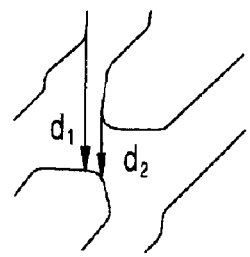
FIGS. 3A to 3G show transition candidate segmentation points used for segmenting touching numeral strings.
Figure 3B:
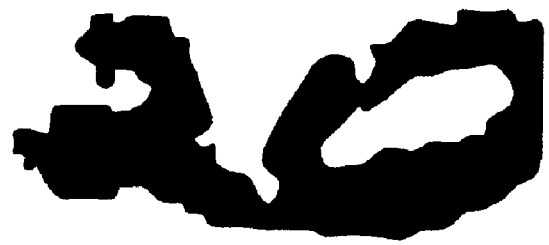
Figure 3C:
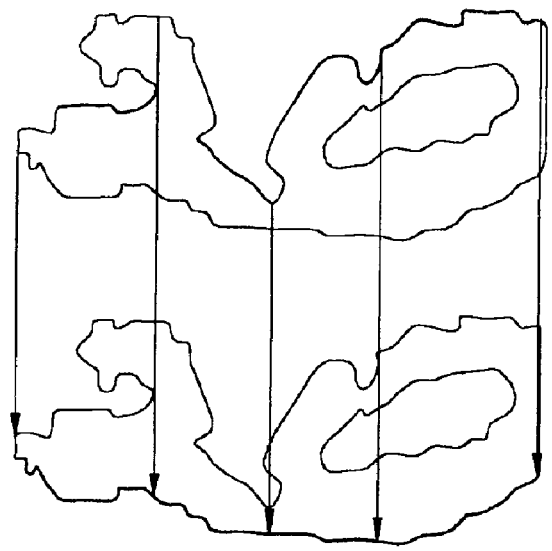
Figure 3D:
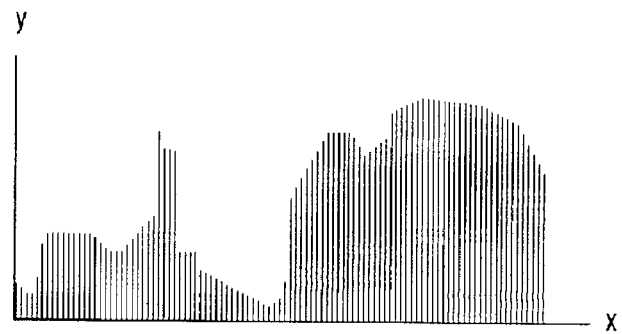
Figure 3E:
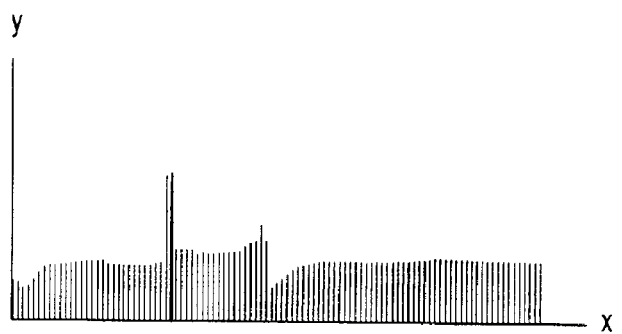
Figure 3F:
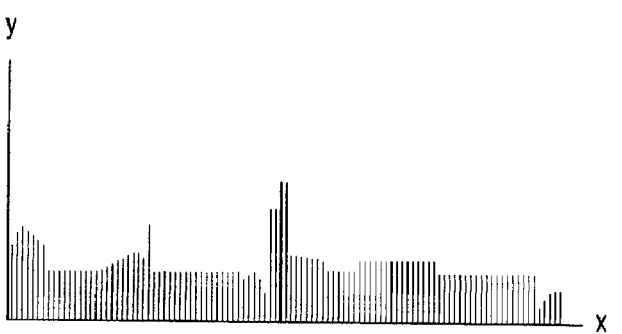
Figure 3G:
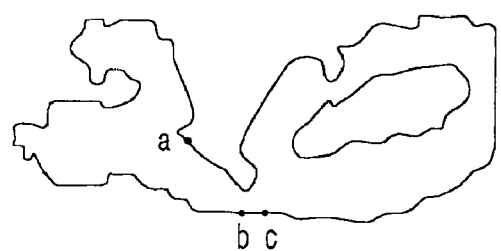

FIGS. 3A to 3G show transition candidate segmentation points used for segmenting the touching numeral string. FIG. 3A shows Large-to-Small transition points (LS transition point) or Small-to-Large transition points (SL transition point) in which a ratio of vertical differences $d_1$ and $d_2$ between upper and lower contours of the neighboring points. For instance, when a person writes 20-digits, it supposes that 2-digit and 0-digit are touched to each other such as the shapes shown in FIG. 3B. At that time, acquiring the image of the 20-digit written by the person, an aggregate of points having a minimum value y relative to the same x-axis on the upper contour may be obtained, such as the picture of FIG. 3C. Similarly, a vertical difference between points each having a minimum value y relative to the same x-axis on the upper contour and a maximum value y relative to the same x-axis on the lower contour may be obtained, as shown in FIG. 3D. As shown in FIGS. 3E and 3F, it searches the LS transition points and the SL transition points, in which its level is more than a critical value, among the ratio of $d_1$ and $d_2$ by computing the normalized vertical difference. Finally, two LS transition points and one SL transition point are found. The LS transition points are a: $(x_1, y_1)$ and b: $(x_2, y_2)$, while the SL transition point is c: $(x_3, y_3)$.

Figure 4A:
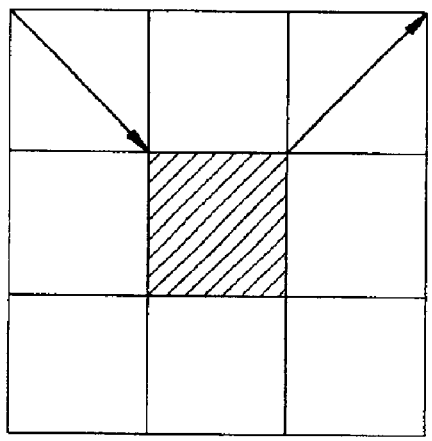
FIGS. 4A to 4C show focal minimum and maximum candidate segmentation points used for segmenting touching numeral strings.
Figure 4B:
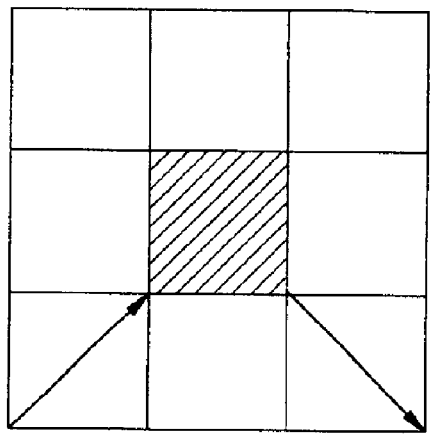
Figure 4C:
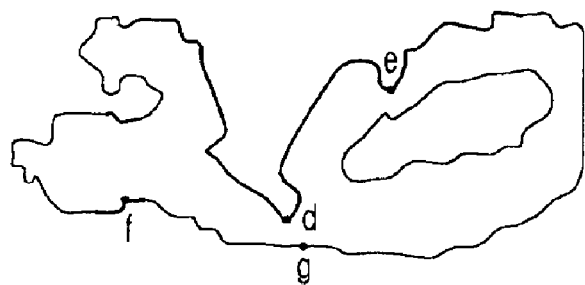

FIGS. 4A to 4C show local minimum and maximum candidate segmentation points used for segmenting the touching numeral strings. The local minimum point is a point in that the value y is to be minimized relative to the same x-axis as shown in FIG. 4A, while the local maximum point is a point in that the value y is to be maximized relative to the same x-axis as shown in FIG. 4B. The regions in that the local point is in the obtained image are called as a valley region, while the region having the local maximum point is called as a slope region. In other words, as will be seen from FIG. 4C, the local minimum points in the valley regions are d: $(x_4, y_4)$ and e: $(x_5, y_5)$, while the local maximum points in the slope regions are f: $(x_6, y_6)$ and g: $(x_7, y_7)$.

Figure 5A:
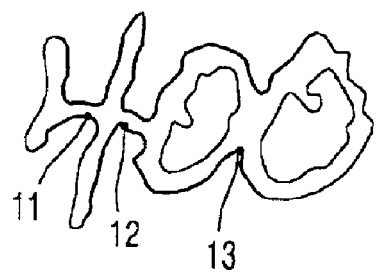
FIGS. 5A and 5D show candidate segmentation points searched in the touching numeral strings.
Figure 5B:
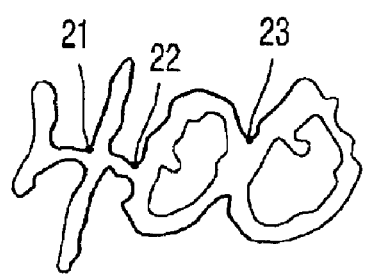
Figure 5C:
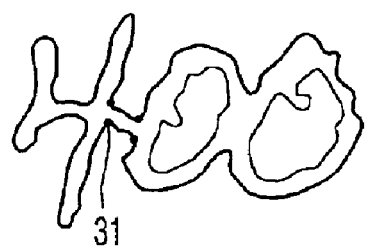
Figure 5D:

FIGS. 5A and 5D show the candidate segmentation points searched in the touching numeral strings. Firstly, it searches the local maximum points in the valley region, in which points 21, 22 and 23 are the local minimum points in FIG. 5B. In addition, it searches the segmentation point due to a distance difference between the upper and lower contours, in which a point 31 is the segmentation point due to the distance difference between the upper and lower contours in FIG. 5C. Finally, the candidate segmentation points analyzed as FIG. 5D are obtained.

With reference to FIGS. 3A to 3G, 4A to 4C, and 5A to 5D, the process of computing the candidate segmentation points which may shown when digits are touched to each other will be again explained.

Firstly, as shown in FIGS. 3A to 3G, if the distance difference between the upper and lower contours of neighboring pixel is more than the critical value, it is selected as the candidate segmentation point.

Secondarily, as shown in FIGS. 4A to 4C and 5A to 5D, the region in which the candidate segmentation points may be existed is computed, and the local and minimum and maximum points existed in the region are selected as the candidate segmentation points.

In step S7, sub-images are segmented by use of the candidate segmentation points. In other words, the sub-images are segmented from the numeral strings by use of the candidate segmentation points.

Figure 6A:
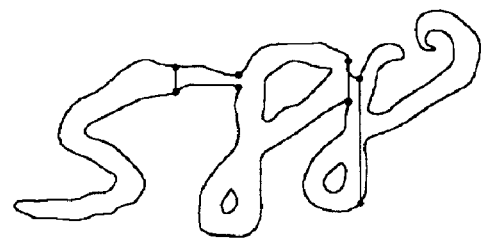
FIGS. 6A to 6E show sub-images segmented by candidate segmentation points.
Figure 6B:
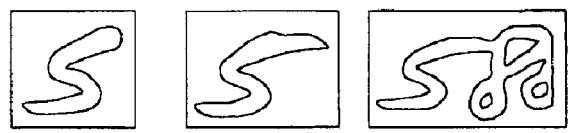
Figure 6C:
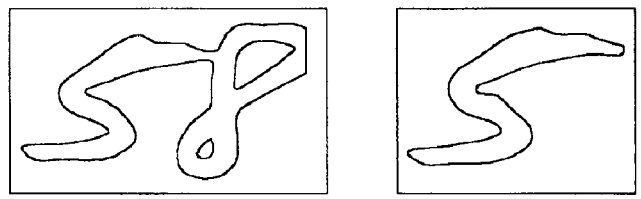
Figure 6D:
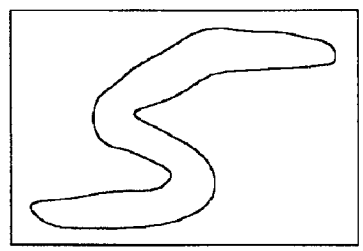
Figure 6E:
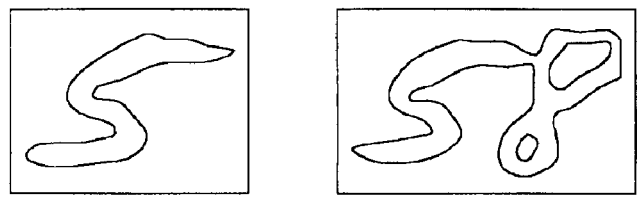

FIGS. 6A to 6E show the sub-images segmented by the candidate segmentation points, after the candidate segmentation points are acquired from the touching numeral string image. In FIG. 6A, the local minimum and maximum points, and the SL and LS transition points are indicated. The sub-images segmented by the local minimum point are shown in FIG. 6B, while the sub-images segmented by the local maximum point are shown in FIG. 6C. The sub-images segmented by the SL transition point are shown in FIG. 6D, while the sub-images segmented by the LS transition point are shown in FIG. 6E.

After all of the candidate segmentation points damaging a portion of the stroke are removed by analyzing the candidate segmentation points obtained in step S6, the images are segmented from the leftmost of the numeral string image to the separate candidate segmentation point to create the sub-images.

In steps S8 and S9, a segmentation confidence value is computed from individual sub-images by use of a defined segmentation error function, and the sub-image with the highest segmentation confidence value is selected as the numeral image segmented from the touching numeral string image. The segmentation confidence value is computed from the critical value on three structural components of the segmentation error function calculated by use of the numeral images samples used in study and three constructional components of segmented sub-image.

Figure 7A:
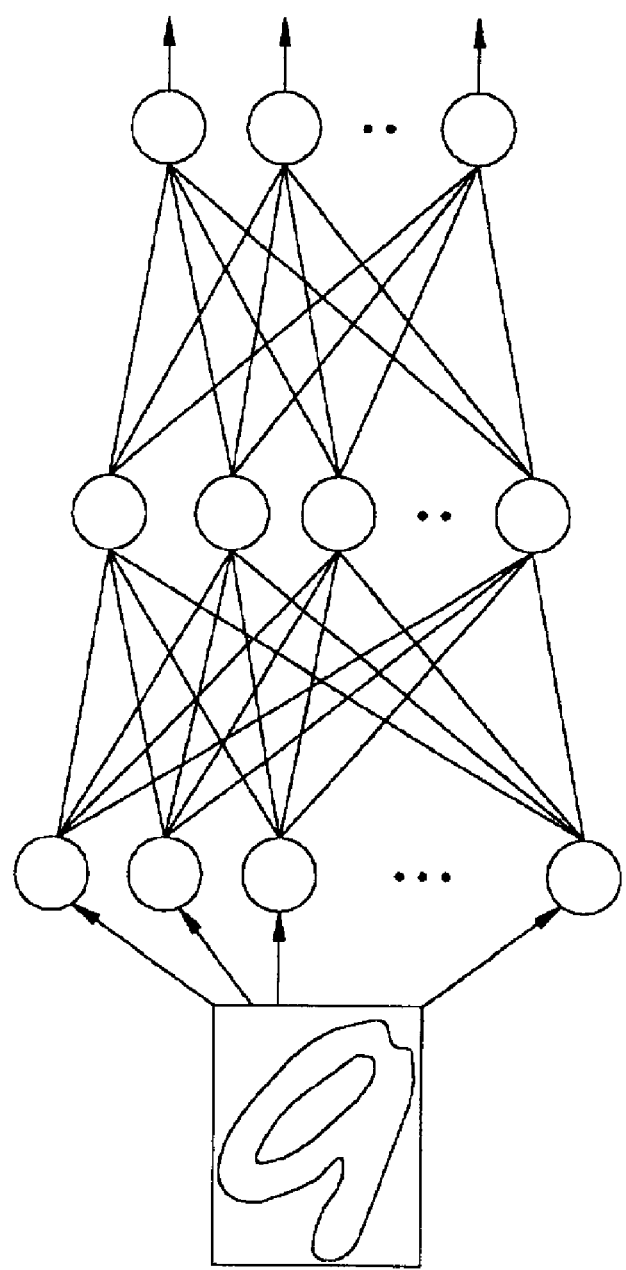
FIGS. 7A to 7C show three construction components of the segmentation error function defined to segment touching numeral strings.
Figure 7B:
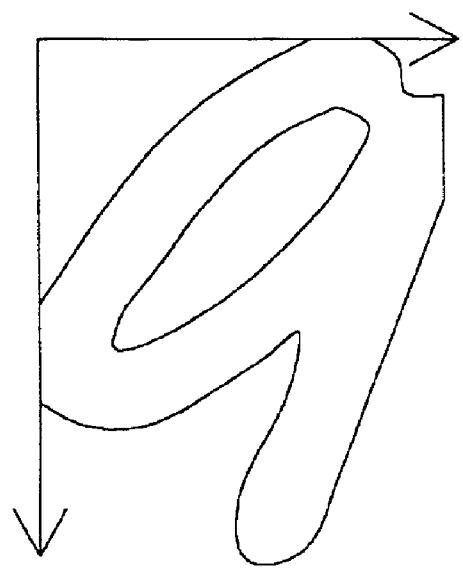
Figure 7C:
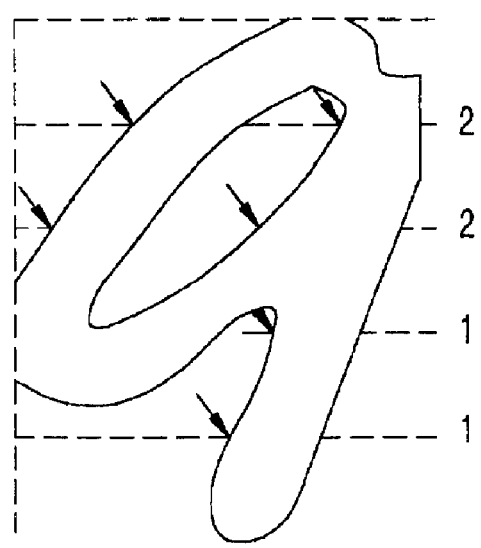

FIGS. 7A to 7C show three construction components of the segmentation error function defined to segment the touching numeral strings. FIG. 7A shows a recognition probability value of the recognition result according to the feature input, FIG. 7B shows an aspect ratio of the image, and FIG. 7C shows a transition value from a background region to a numeral region in a horizontal direction.

The critical value and a recognition rejection value are computed every numeral classes 0 to 9 on each component from independent separate numeral samples used in the study.

Firstly, a minimum boundary rectangle (MBR) of the numeral image is computed.

Secondarily, an average value of the aspect ratio of the digit is computed. After the aspect ratio of the digits corresponding to digit classes 0 to 9 used in the study is computed and accumulated, the average value of the aspect ratio on each of digit classes 0 to 9. Its mathematically defining equation is as following:

$$T_a(i) = \frac{1}{N_i} \sum_{j=0}^{N_i} a_{ij} \quad i = 0, 1, 2, \ldots, 9 \qquad \text{Equation 1}$$

wherein, $T_a(i)$ is an average value of an aspect ratio of a numeral image computed on a digit class i, $a_{ij}$ is the aspect ratio of the image of the $j_{th}$ sample contained in the digit class i, and $N_i$ is the number of samples contained in each class.

Thirdly, a horizontal transition average value of the pixel is computed. After the numeral image is normalized in a 50×50 size, and the horizontal transition value which is transited from the background pixel to a digit region pixel at 5 pixel intervals, i.e., 5, 10, 15, ..., $50^{th}$ row is accumulated, the horizontal pixel transition average value is computed on each digit class.

$$T_t(i) = \frac{1}{N_i} \sum_{j=0}^{N_i} t_{ij} \quad i = 0, 1, 2, \ldots, 9 \qquad \text{Equation 2}$$

wherein, $T_t(i)$ is a horizontal transition average value of a pixel relative to a partial region computed on a digit class i, $t_{ij}$ is the horizontal transition average value of the $j^{th}$ sample contained in the digit class i, and $N_i$ is the number of samples contained in each class.

Fourthly, an average recognition probability value is computed. The recognized results every each digit class of the independent separate digits used in the study are accumulated to obtain an average value. Its mathematically defining equation is as following:

$$T_r(i) = \frac{1}{N_i}\sum_{j=0}^{N_i} r_{ij} \quad i = 0, 1, 2, \ldots, 9 \qquad \text{Equation 3}$$

wherein, $T_r(i)$ is an average recognition probability value each computed on a digit class i, $r_{ij}$ is the recognition probability value of the $j^{th}$ sample contained in the digit class i, and $N_i$ is the number of samples contained in each class.

Figure 8A:
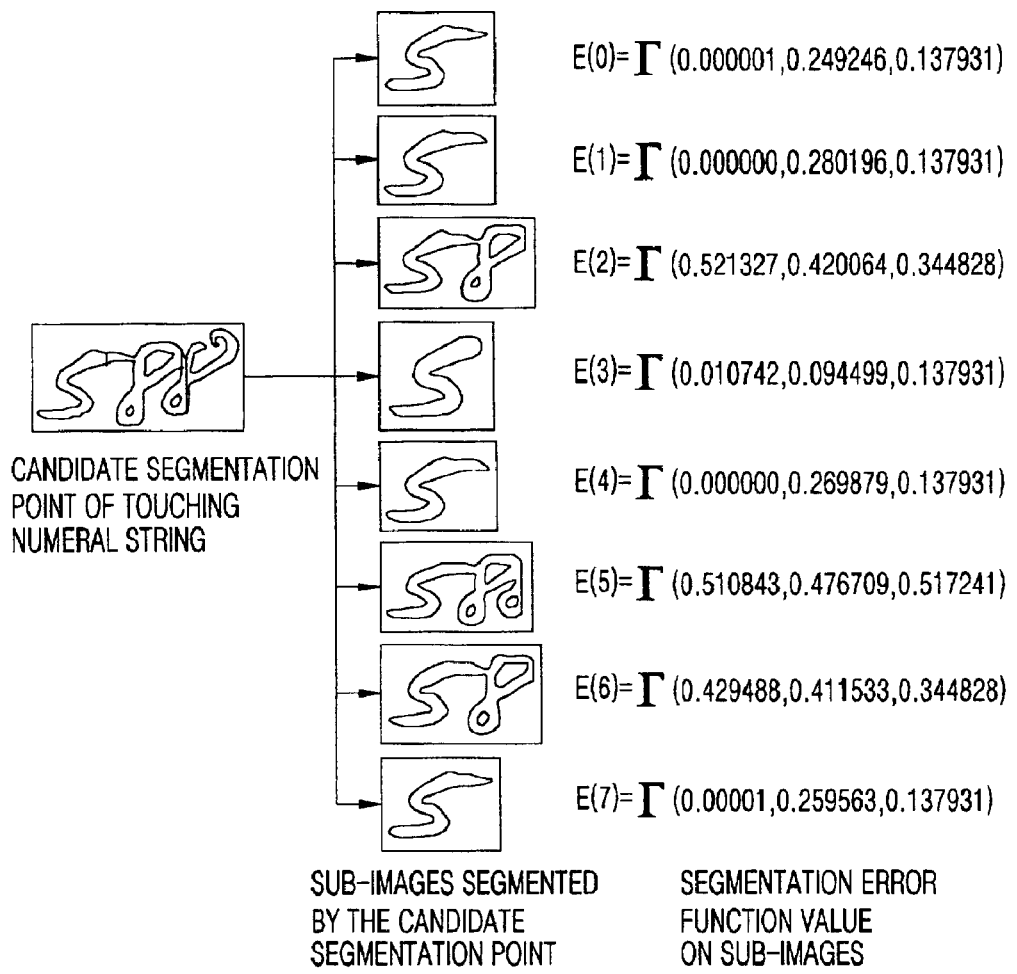
FIGS. 8A to 8E are views showing a process of segmenting digits with the highest confidence value in the touching numeral string by computing a segmentation confidence value from a partial error function value.
Figure 8B:
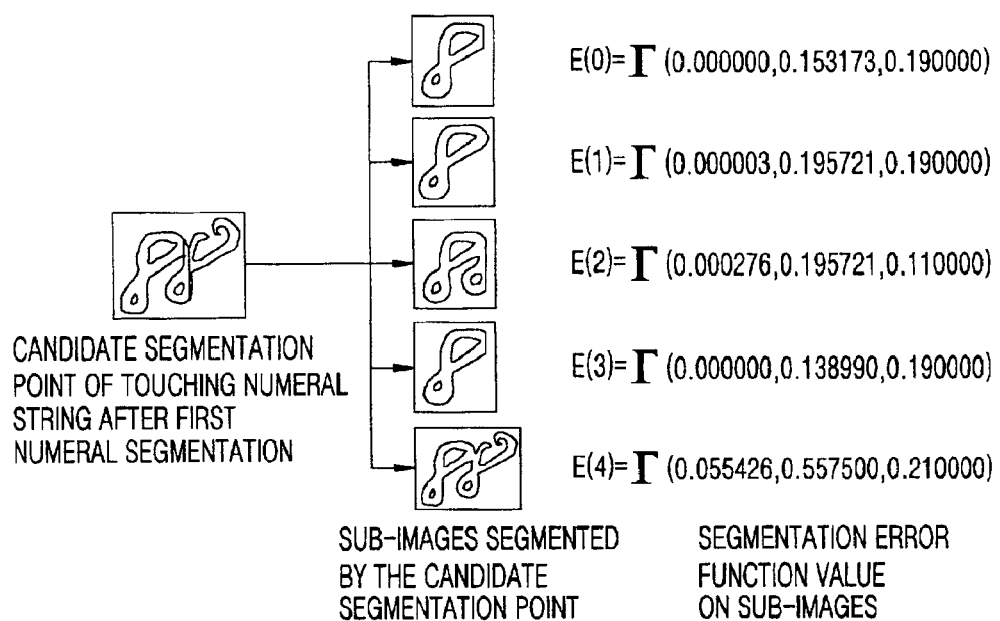
Figure 8C:
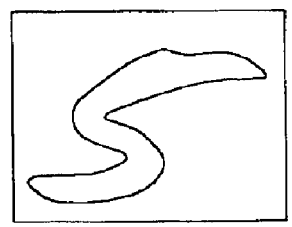
Figure 8D:
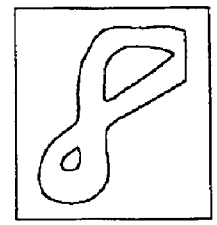
Figure 8E:
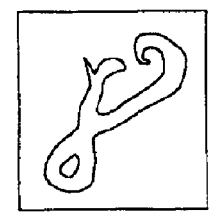

FIGS. 8A to 8E are views showing a process of segmenting digits with the highest confidence value in the touching numeral string by computing the segmentation confidence value from the partial error function value. In order to select normalized sub-image of the sub-images segmented by the candidate segmentation point as shown in FIGS. 6A to 6E, the segmentation error function is defined by use of the structural feature information and recognized results of the digit, as shown in FIGS. 7A to 7C. FIG. 8A shows the candidate segmentation points of the touching numeral strings, the sub-images segmented by the segmentation points, and the segmentation error function values E(0) to E(7) on each sub-image. In addition, FIG. 8B shows the candidate segmentation points of the remaining touching numeral strings after the first digit is segmented, the sub-images segmented by the segmentation points, and the segmentation error function values E(0) to E(4) on each sub-image. FIGS. 8C to 8E are images of the digits segmented in the highest confidence value. FIG. 8C is the image of the firstly segmented digit, FIG. 8D is the image of the secondarily segmented digit, and FIG. 8E is the image of the thirdly segmented digit.

It computes the critical value of the structural features and the recognized results with the rejection value by use of the numeral image samples used in the study. After computing each constructional component value of the error function on each sub-image as shown in FIGS. 8A to 8E, the segmentation confidence value is computed by use of the pre-calculated critical value and the confidence rejection value, thereby obtaining an aspect ratio $a_l$ of the numeral image, a horizontal transition value $t_l$ of the pixel relative to the partial region, and a recognition probability value $r_l$ on the sub-image $l^{th}$-segmented by the candidate segmentation point. A segmentation error of the $l^{th}$-segmented sub-image on each component of the segmentation error function is computed as following:

$$err_a(l) = \frac{a_l - T_a(i)}{\max} a_l \Big| i = \text{recognized class}, \qquad \text{Equation 4}$$
$$\text{wherein } l = 1, 2, 3, \ldots, S$$

$$err_t(l) = \frac{t_l - T_t(i)}{\max} t_l \Big| i = \text{recognized class}, \qquad \text{Equation 5}$$
$$\text{wherein } l = 1, 2, 3, \ldots, S$$

$$err_r(l) = r_l - T_r(i) t_l | i = \text{recognized class, wherein } l=1, 2, 3, \ldots, S$$
Equation 6 wherein, i is a digit class, l is the $l^{th}$-segmented sub-image, and S is the number of segmented sub-images. By use of error values of three components obtained according to the equations 4 to 6, the segmented error value on the $l^{th}$-segmented sub-image may be computed as following:

$$E(l)=\Gamma(err_a(l), err_t(l), err_r(l)), \text{ wherein } \Gamma(a,b,c)=(a^2+b^2+c^2)$$
Equation 7

The segmented confidence value of the $l^{th}$-segmented sub-image may be computed as following:

$$R(l)=1-E(l) \quad l=1, 2, 3, \ldots, S \qquad \text{Equation 8}$$

In step S10, the feature is extracted to recognize the segmented numeral image. In order to recognize the segmented digit, a mesh, a horizontal transition point, a directional component of a chain code, the number of holes, an aspect ratio of the digit, distance features and the like are extracted to constitute the feature vector.

In step S11, the segmented numeral image is recognized.

In step S12, the numeral image selected from the touching numeral string in the highest segmentation confidence value is segmented. In other words, the leftmost digit of the touching digits is selected as the sub-image with the highest confidence value.

As shown in FIGS. 8C to 8E, the sub-image having the highest confidence value among the segmentation confidence values computed on each sub-image in step S10 is selected ass the segmented results of the segmented numeral image.

After the numeral image is segmented in the touching numeral strings, if a next numeral string image is existed, the process proceeds to step S4. If it is the touching numeral string, the processes S5 to S9 are repeated to segment the digit. Specifically, if the image which is left after segmenting the digit selected from the touching numeral strings is the touching numeral string image, the processes S5 to S9 are repeated. After analyzing that it is determined whether the touching numeral string image which is left after segmenting the numeral image selected at step S9 is the separate numeral image or touching numeral string image, the process of segmenting the separate numeral image is repeated until there is no any touching numeral string.

The present invention suggests the method of segmenting touching numeral strings contained in handwritten touching numeral strings, and recognizing the numeral strings by use of characteristic information and recognized results provided by inherent structure of digits. In order to improve the accuracy of the segmentation, the segmentation error function is defined, and the sub-images are segmented by use of the candidate segmentation points found from the touching numeral strings. The sub-image with the highest confidence value is selected as a final segmentation numeral image.

With the method described above, the present invention employs the structural feature information of the digit and the recognized result value to segment the touching numeral string into the separate numerals and recognize the digit, and selects the segmented image with the highest confidence value as the finally segmented results by defining the segmentation error function, thereby improving a recognizing rate of the numeral strings by reducing an error recognizing rate according to the error segmentation of the typical segmentation-based recognition method. The present segmentation method segments and recognizes the separate numerals from the numeral strings, without having pre-knowledge on the length of the numeral strings, thereby no depending upon the length of the numeral strings and thus obtaining the stable recognized results. This can improve the recognizing rate of the touching numeral string which is a major factor of the error recognition in the recognition of the handwritten numeral string, so that the present invention can be employed in the application system in which the handwritten numeral string recognition is applied to the environment not restricting the handwriting condition.

The present invention relates to reduce the error recognizing rate happened due to the error segmentation by normally segmenting the touching numeral string which is a major factor of the error recognition in the recognition of the handwritten numeral string. Based on the feature information (the aspect ratio of the digit and the transition value of the horizontal pixel relative to the partial region) and the recognized information, the method of segmenting and recognizing the numeral strings contained the touching numeral strings computes the segmentation error value of each sub-image segmented by the candidate segmentation points, and segments the sub-image with the highest confidence value into the numeral image.

The forgoing embodiment is merely exemplary and is not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. A method for segmentation-based recognizing handwritten touching numeral strings, the method comprising the steps of:
   a) receiving a handwritten numeral string extracted from a pattern document;
   b) smoothing a curved numeral image of the handwritten numeral string, and searching connecting components in the numeral image;
   c) determining whether or not the numeral string is a touching numeral string;
   d) if it is determined that the numeral string is the touching numeral string, searching a contour of the touching numeral string image;
   e) searching candidate segmentation points in the contour, and segmenting sub-images;
   f) computing a segmentation confidence value on each segmented sub-image by use of a segmentation error function to select the sub-image with the highest segmentation confidence value as a segmented numeral image in the touching numeral string image;
   g) if it is determined in the step c that the numeral string is not the touching numeral string, extracting a feature to recognize the segmented numeral image;
   h) segmenting the numeral image selected from the touching numeral string in the highest segmenting confidence value; and
   i) obtaining remaining numeral string image.

2. The method for segmentation-based recognizing handwritten touching numeral strings as claimed in claim 1, wherein in the step a, samples of handwritten numeral strings extracted from a NIST SD19 database are used to obtain samples of numeral strings handwritten in various forms.

3. The method for segmentation-based recognizing handwritten touching numeral strings as claimed in claim 1, wherein in the step e, the candidate segmentation points comprise local minimum and maximum points, and Large-to-Small or Small-to-Large transition points.

4. The method for segmentation-based recognizing handwritten touching numeral strings as claimed in claim 1, wherein the step e comprises the steps of:
   e-1) if a distance difference between contours of neighboring pixels is more than a critical value, selecting the pixel as the candidate segmentation point;
   e-2) obtaining a region in which the candidate segmentation points are existed, and selecting the local minimum and maximum points as the candidate segmentation point existed in the region;
   e-3) analyzing the candidate segmentation points, and removing all of candidate segmentation points damaging a portion of a stroke, among the analyzed candidate segmentation points; and
   e-4) segmenting the image from a left of a minimum boundary rectangle to the candidate segmentation point in the numeral string image to create sub-images.

5. The method for segmentation-based recognizing handwritten touching numeral strings as claimed in claim 1, wherein the step f comprises the steps of:
   f-1) defining a segmentation error function by use of structural feature information and recognized results of the digit;
   f-2) computing a critical value of the structural features and a rejection value on the recognized result by use of numeral image samples used in the study;
   f-3) computing each constructional component value of the error function on each sub-image;
   f-4) computing a segmentation confidence value by use of the pre-calculated critical value and recognition rejection value;
   f-5) computing a recognition probability value $r_j$ of a sub-image $l^{th}$-segmented by the candidate segmentation point, a horizontal transition value $t_l$ of a pixel on a partial region, and an aspect ratio $a_l$ of the numeral image;
   f-6) computing three component values of the $l^{th}$-segmented sub-image on each component of segmentation error function;
   f-7) computing a segmentation error value of the $l^{th}$-segmented sub-image by use of the error values; and
   f-8) computing a segmentation confidence value of the $l^{th}$-segmented sub-image.

6. The method for segmentation-based recognizing handwritten touching numeral strings as claimed in claim 5, wherein in the step f-2, to compute the segmentation confidence value of the segmented sub-image, an average value of the aspect ratio of the \numeral image every numeral classes 0 to 9, an average horizontal pixel transition value, and an average recognition probability value are computed to be used as an critical value.

7. The method for segmentation-based recognizing handwritten touching numeral strings as claimed in claim 5, wherein in the step f-6, the segmentation error value is calculated in accordance with:

$$err_a(l) = \frac{a_l - T_a(i)}{\max} a_l$$

$$err_t(l) = \frac{t_l - T_t(i)}{\max} t_l$$

$$err_r(l) = r_l - T_r(i)$$

wherein, i is a recognized digit class, S is the number of segmented sub-images, l is a sub-image $l^{th}$-segmented from 1 to S, $a_l$ is an aspect ratio of the numeral image, $t_l$ is a horizontal transition value of the pixel relative to the partial region, $r_l$ is a recognition probability value of the sub-image $l^{th}$-segmented by the candidate segmentation point, $T_a(i)$ is an average value of an aspect ratio of a numeral image computed on a digit class i, $T_t(i)$ is a horizontal transition average value of a pixel relative to a partial region computed on a digit class i, and $T_r(i)$ is an average recognition probability value each computed on a digit class i.

8. The method for segmentation-based recognizing handwritten touching numeral strings as claimed in claim 5, wherein in the step f-7, the segmented error value of the $l^{th}$-segmented sub-image is calculated in accordance with:

$$E(l) = \Gamma(\text{err}_a(l), \text{err}_t(l), \text{err}_r(l)), \text{ wherein } \Gamma(a,b,c) = (a^2 + b^2 + c^2).$$

9. The method for segmentation-based recognizing handwritten touching numeral strings as claimed in claim 5, wherein in the step f-8, the segmentation confidence value of the $l^{th}$-segmented sub-image is calculated in accordance with:

$$R(l) = 1 - E(l) \quad l = 1, 2, 3, \ldots, S.$$

10. The method for segmentation-based recognizing handwritten touching numeral strings as claimed in claim 5, wherein the step f-2 comprises the steps of:
   f-2-1) computing a minimum boundary rectangle on the numeral image;
   f-2-2) computing an average value of the aspect ratio of the digit;
   f-2-3) computing a horizontal transition average value of the pixel; and
   f-2-4) computing an average recognition probability value.

11. The method for segmentation-based recognizing handwritten touching numeral strings as claimed in claim 10, wherein the step f-2-2 comprises the steps of:
   f-2-2-1) computing the aspect ratio of the digits corresponding to digit classes 0 to 9 used in the study;
   f-2-2-2) accumulating the aspect ratio computed in the step f-2-2-1; and
   f-2-2-3) computing the average value of the aspect ratio on each of digit classes 0 to 9.

12. The method for segmentation-based recognizing handwritten touching numeral strings as claimed in claim 10, wherein in the step f-2-2, the average value of the aspect ratio of the digit is computed in accordance with:

$$T_a(i) = \frac{1}{N_i} \sum_{j=0}^{N_i} a_{ij} \quad i = 0, 1, 2, \ldots, 9$$

wherein, $T_a(i)$ is an average value of an aspect ratio of a numeral image computed on a digit class i, $a_{ij}$ is the aspect ratio of the image of the $j^{th}$ sample contained in the digit class i, and $N_i$ is the number of samples contained in each class.

13. The method for segmentation-based recognizing handwritten touching numeral strings as claimed in claim 10, wherein the step f-2-3 comprises the steps of:
   f-2-3-1) normalizing the numeral image in a 50×50 size;
   f-2-3-2) accumulating the horizontal transition value which is transited from the background pixel to a digit region pixel at 5 pixel intervals, i.e., 5, 10, 15, ..., $50^{th}$ row; and
   f-2-3-3) computing the horizontal pixel transition average value on each digit class.

14. The method for segmentation-based recognizing handwritten touching numeral strings as claimed in claim 10, wherein in the step f-2-3, horizontal transition average value of the pixel is computed in accordance with:

$$T_t(i) = \frac{1}{N_i} \sum_{j=0}^{N_i} t_{ij} \quad i = 0, 1, 2, \ldots, 9$$

wherein, $T_t(i)$ is a horizontal transition average value of a pixel on a partial region computed on a digit class i, $t_{ij}$ is the horizontal transition average value of the $j^{th}$ sample contained in the digit class i, and $N_i$ is the number of samples contained in each class.

15. The method for segmentation-based recognizing handwritten touching numeral strings as claimed in claim 10, wherein the step f-2-4 comprises the steps of:
   f-2-4-1) accumulating the recognized results every digit class relative to the independent separate numerals used in the study; and
   f-2-4-2) dividing the accumulated recognition result value with the number of digit classes to compute an average value.

16. The method for segmentation-based recognizing handwritten touching numeral strings as claimed in claim 10, wherein in the step f-2-4, the average recognition probability value is computed in accordance with:

$$T_t(i) = \frac{1}{N_i} \sum_{j=0}^{N_i} t_{ij} \quad i = 0, 1, 2, \ldots, 9$$

wherein, $T_t(i)$ is a horizontal transition average value of a pixel on a partial region computed on a digit class i, $t_{ij}$ is the horizontal transition average value of the $j^{th}$ sample contained in the digit class i, and $N_i$ is the number of samples contained in each class.

17. The method for segmentation-based recognizing handwritten touching numeral strings as claimed in claim 1, wherein in the step f, the segmentation error function consists of the aspect ratio of the image, the horizontal pixel transition value relative to the partial region, and the recognized results.

18. The method for segmentation-based recognizing handwritten touching numeral strings as claimed in claim 1, wherein in the step h, a leftmost digit of touching digits is selected as the sub-image with the highest confidence value among the computed segmented confidence value on each sub-image.

19. The method for segmentation-based recognizing handwritten touching numeral strings as claimed in claim 1, further comprising a step j) of segmenting the numeral image in the touching image, and if a next numeral string image is existed, proceeding to the step c.

* * * * *

UNITED STATES PATENT AND TRADEMARK OFFICE
CERTIFICATE OF CORRECTION

PATENT NO. : 6,920,246 B2 Page 1 of 1
DATED : July 19, 2005
INVENTOR(S) : Kye Kyung Kim et al.

It is certified that error appears in the above-identified patent and that said Letters Patent is hereby corrected as shown below:

<u>Title page,</u>
Item [73], Assignee "Electronics and Telecommunication Research Institute" should be -- Electronics and Telecommunications Research Institute --.

Signed and Sealed this

Seventeenth Day of January, 2006

JON W. DUDAS
*Director of the United States Patent and Trademark Office*